United States Patent
Tarzia

(10) Patent No.: US 6,546,948 B2
(45) Date of Patent: Apr. 15, 2003

(54) MIXER VALVE

(75) Inventor: Umberto Tarzia, Concord (CA)

(73) Assignee: American Faucet Inc., Concord ( * ) Notice: Subject to any disclaimer, the term of this patent is extended or adjusted under 35 U.S.C. 154(b) by 0 days.

(21) Appl. No.: 09/878,191

(22) Filed: Jun. 12, 2001

(65) Prior Publication Data

US 2002/0059953 A1 May 23, 2002

Related U.S. Application Data

(60) Provisional application No. 60/210,822, filed on Jan. 12, 2000.

(51) Int. Cl.[7] .............................................. G05D 11/16
(52) U.S. Cl. ...................................... 137/98; 137/454.6
(58) Field of Search ............................... 137/454.6, 98, 137/100

(56) References Cited

U.S. PATENT DOCUMENTS

| | | | |
|---|---|---|---|
| 4,986,306 A | | 1/1991 | Ferrari |
| 5,299,593 A | | 4/1994 | Ottelli |
| 5,375,624 A | * | 12/1994 | Knapp ................... 137/625.17 |
| 5,538,041 A | | 7/1996 | Ganzle |
| 5,725,010 A | * | 3/1998 | Marty et al. ................. 137/100 |
| 5,727,587 A | * | 3/1998 | Yang ........................... 137/100 |
| 6,029,687 A | * | 2/2000 | Chang ........................... 137/98 |
| 6,182,682 B1 | * | 2/2001 | Chen ............................. 137/98 |

* cited by examiner

*Primary Examiner*—Stephen M. Hepperle
(74) *Attorney, Agent, or Firm*—Gowling Lafleur Henderson LLP; Mark W. Sajewycz

(57) ABSTRACT

A mixer valve assembly is provided comprising a pressure balancer cartridge including radially extending lugs, a mixer valve in fluid communication with, and supported by the pressure balancer cartridge, and a housing fitted over the pressure balancer cartridge and the mixer valve, the housing including notches for coupling to the lugs. The mixer valve can be used as part of a water faucet assembly. In this respect, a water faucet assembly is also provided comprising a faucet body including a sleeve, a base provided at one end of the sleeve, and fluid passages formed in the base, and a mixer valve assembly, disposed within the faucet body, including a pressure balancer cartridge including radially extending lugs, a mixer valve in fluid communication with, and supported by the pressure balancer cartridge, and a housing fitted over the pressure balancer cartridge and the mixer valve, the housing including notches for coupling to the lugs.

24 Claims, 16 Drawing Sheets

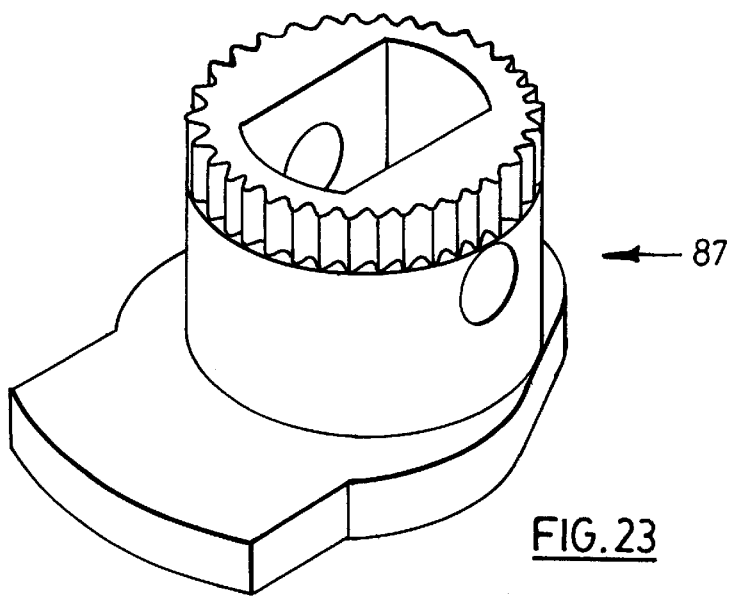
FIG. 23
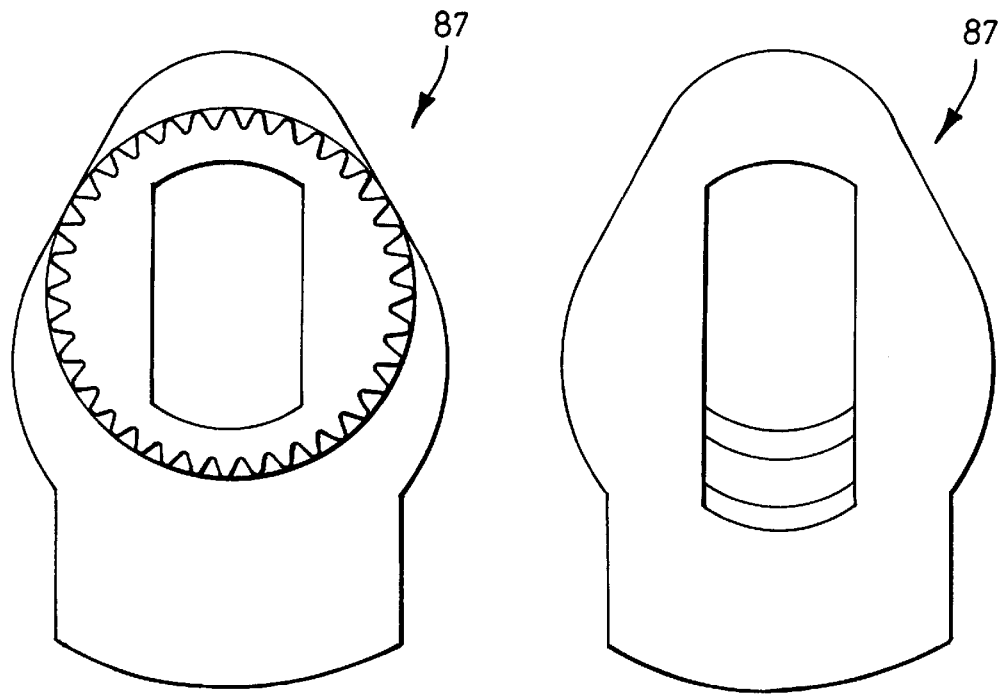
FIG. 24                    FIG. 25

MIXER VALVE

This application claims the benefit of Provisional application Ser. No. 60/210,822, filed Jan. 12, 2000.

FIELD OF THE INVENTION

The present invention relates to water faucets, particularly to mixer valves employed in such water faucets.

BACKGROUND OF THE INVENTION

Water faucets typically include mixer valve assemblies for enabling the mixing of supplied hot and cold water streams to produce a tempered, mixed water stream. The mixer valve assembly is typically manufactured independently of the water faucet body. As such, it is desirable to manufacture the mixer valve assembly with a view to enabling ease of installation within the water faucet body. Because a mixer valve generally comprises several moveable components, mechanically engaged to one another, challenges facing assembly of such components must be addressed while still overcoming the installation challenges.

SUMMARY OF THE INVENTION

The present invention provides a mixer valve assembly, comprising a pressure balancer cartridge and a mixer valve, and a housing fitted over the pressure balancer cartridge and the mixer valve.

In one aspect, the present invention provides a mixer valve assembly comprising a pressure balancer cartridge including radially extending lugs, a mixer valve in fluid communication with, and supported by the pressure balancer cartridge, and a housing fitted over the pressure balancer cartridge and the mixer valve and including notches for coupling to the lugs.

In another aspect, the present invention provides a mixer valve as described above, wherein the pressure balancer cartridge includes a first hot water passage, a first cold water passage, and a first mixed water passage, and wherein the mixer valve includes a second hot water passage, a second cold water passage, and a second mixed water passage, and wherein the first hot water passage is coupled to the second hot water passage, the first cold water passage is coupled to the second cold water passage, and the first mixed water passage is coupled to the second mixed water passage.

In another aspect, the mixer valve includes a mixing chamber coupled to each of the second hot water passage and the second cold water passage.

The present invention further provides a mixer valve assembly a pressure balancer cartridge including radially extending lugs, a mixer valve in fluid communication with, and supported by the pressure balancer cartridge, and a housing fitted over the pressure balancer cartridge and the mixer valve and including notches for coupling to the lugs, wherein the housing includes an exterior surface, and wherein a sealing member is disposed by the exterior surface.

The present invention also provides a mixer valve assembly comprising a pressure balancer cartridge including radially extending lugs, a mixer valve in fluid communication with, and supported by the pressure balancer cartridge, and a housing fitted over the pressure balancer cartridge and the mixer valve and including notches for coupling to the lugs wherein the housing includes a first end and a second end, and wherein the first end includes a first aperture and the second end includes a second aperture, and wherein the mixer valve includes a control lever extending through the first aperture, and wherein the cartridge extends through the second aperture.

In a further aspect, the pressure balancer cartridge includes a first end and a second end, in wherein a plurality of feet project from the first end, and wherein the mixer valve is supported on the second end.

In yet a further aspect, the first end is characterized by a substantially planar surface, and the lugs are substantially co-planar with the first end surface.

The present invention also provides a water faucet comprising a faucet body including a sleeve, a base provided at one end of the sleeve and fluid passages formed in the base, and a mixer valve including a pressure balancer cartridge including radially extending lugs, a mixer valve in fluid communication with, and supported by a pressure balancer cartridge, and a housing fitted over the pressure balancer cartridge and the mixer valve and including notches for coupling to the lugs.

The present invention further provides a mixer valve assembly comprising a pressure balancer cartridge including radially extending lugs, a mixer valve including in communication with and supported by the pressure balancer cartridge, and a housing fitted over the pressure balancer cartridge and the mixer valve and including notches fitted over the lugs.

BRIEF DESCRIPTION OF THE DRAWINGS

The invention will be better understood when consideration is given to the following detailed description thereof. Such description makes reference to the annexed drawings wherein:

FIG. 23 is a perspective view of the lever housing of the mixer valve of an embodiment of a mixer valve assembly of the present invention;

FIG. 24 is a top perspective view of the lever housing illustrated in FIG. 23;

FIG. 25 is a bottom plan view of the lever housing illustrated in FIG. 23;

DETAILED DESCRIPTION

Figure 1:
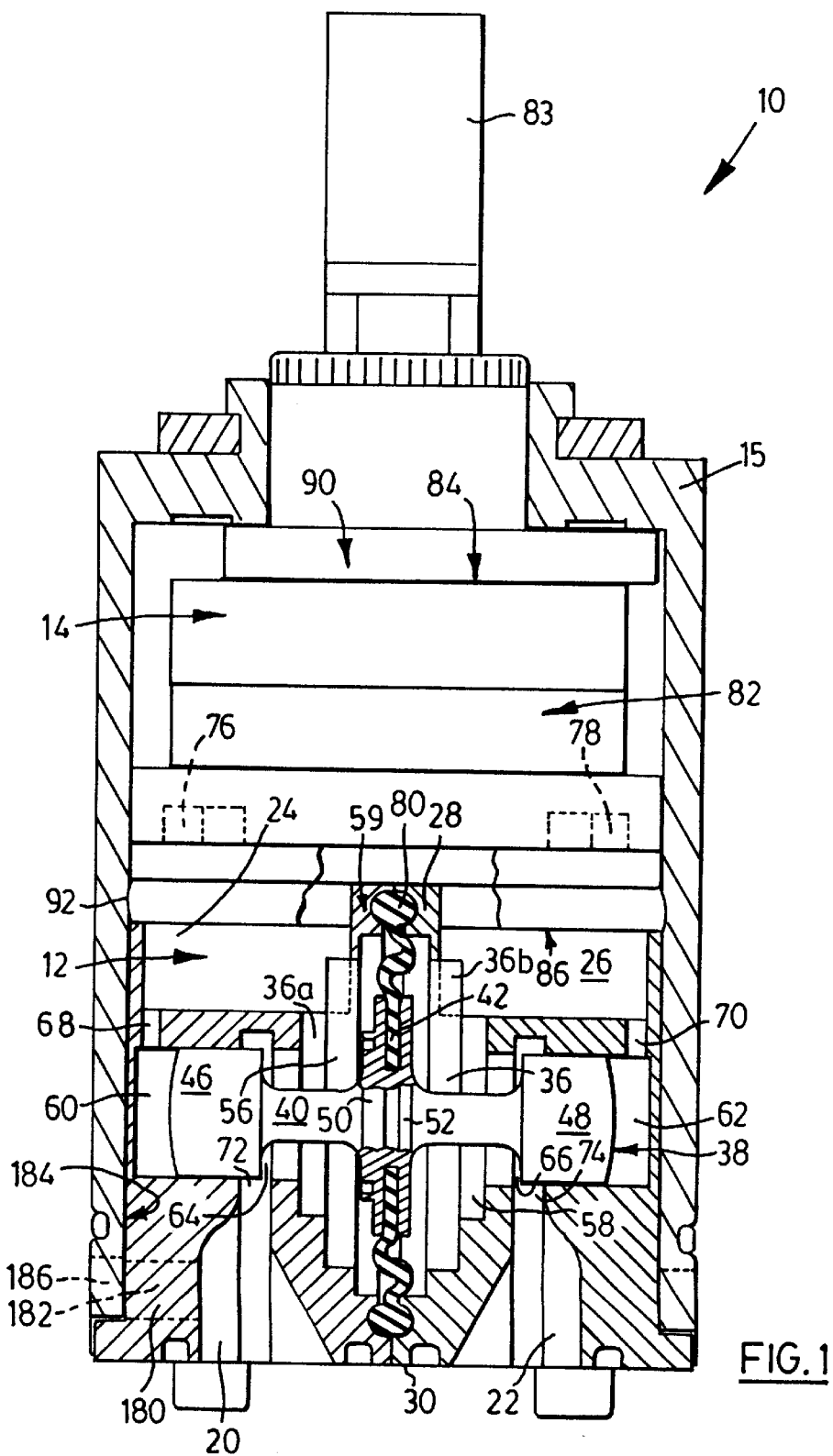
FIG. 1 is a sectional elevation view of an embodiment of a mixer valve assembly of the present invention.

FIG. 1 illustrates an embodiment of a mixer valve assembly 10 of the present invention. Mixer valve assembly 10 includes a pressure balancer cartridge 12 and a mixing plate assembly 14. Pressure balancer cartridge 12 and mixing plate assembly 14 are contained within housing 15.

Figure 2:
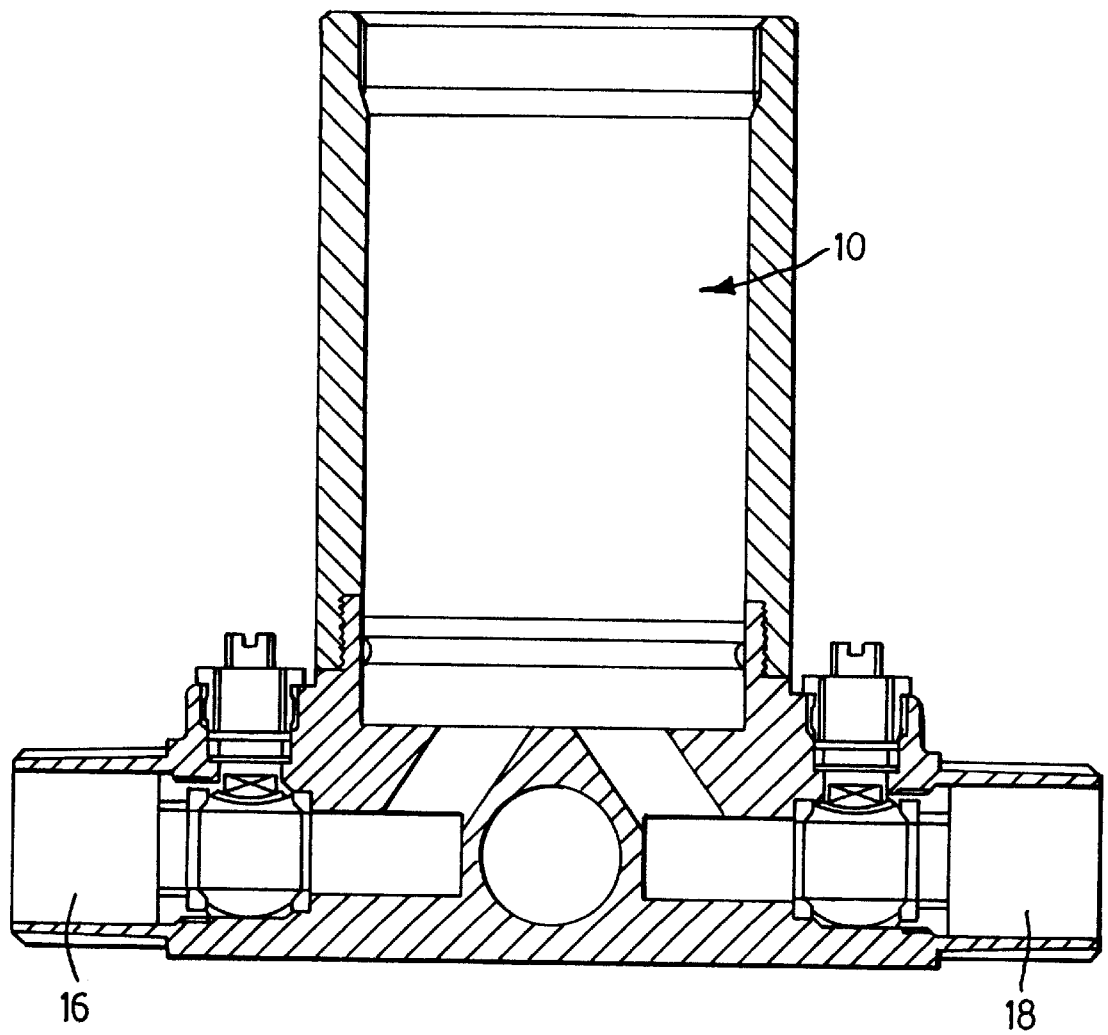
FIG. 2 is a sectional elevation view of an embodiment of a water faucet of the present invention.

Hot and cold water is supplied to mixer valve assembly 10 by existing supply conduits 16 and 18 respectively (see FIG. 2). Mixing plate assembly 14 promotes mixing of the supplied hot and cold water to produce a mixed water stream characterized by a temperature intermediate to that of the supplied hot and cold water. Pressure balance cartridge 12 attempts to mitigate the effects of transient pressure drops in the hot and cold water being supplied to the mixer valve 10.

Figure 3:
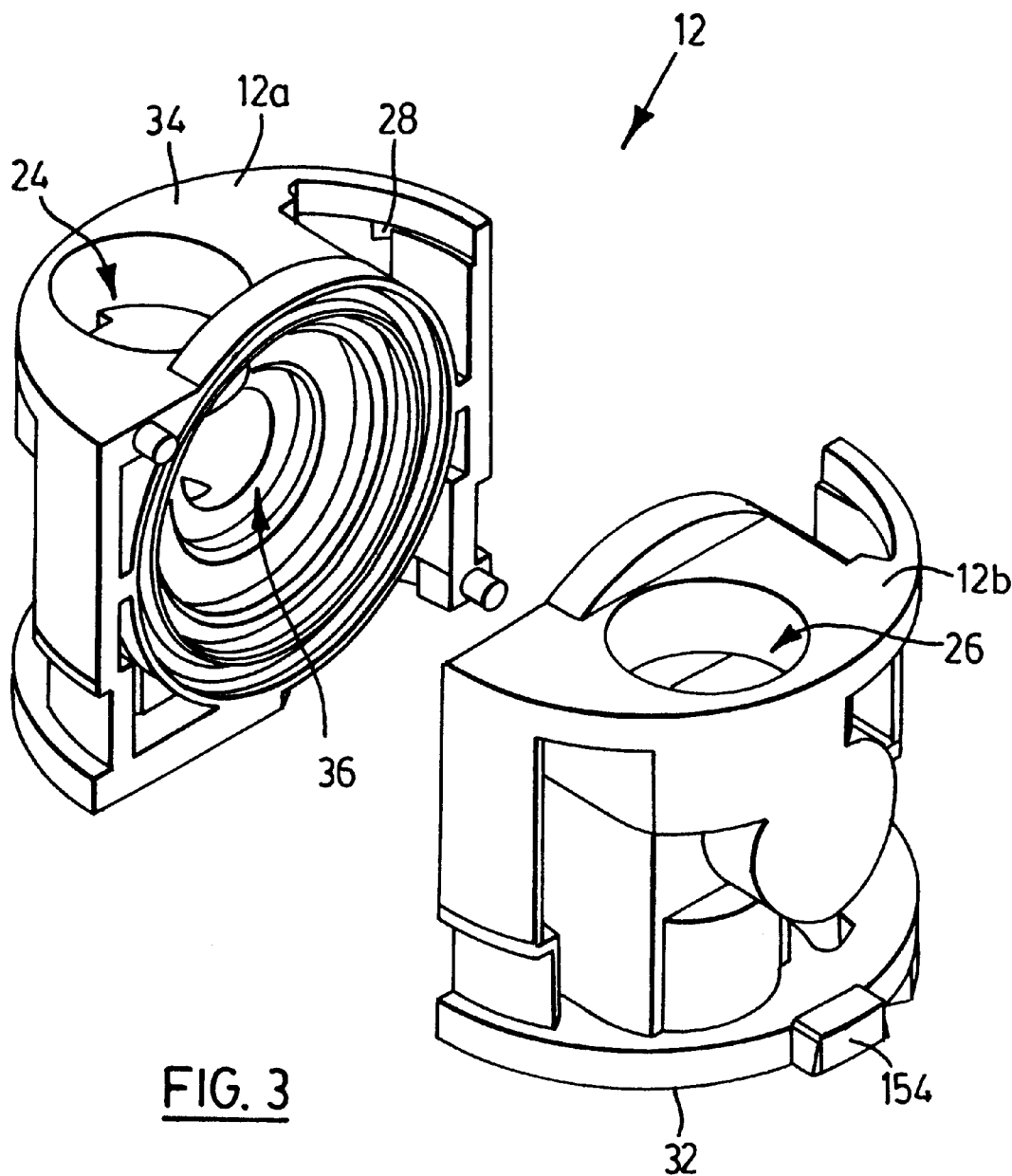
FIG. 3 is an exploded perspective view of a pressure balancer cartridge of an embodiment of a mixer valve assembly of the present invention, wherein the diaphragm of the pressure balancer cartridge is removed for clarity.

Pressure balancer cartridge 12 is comprised of first and second halves 12a and 12b (see FIG. 3). First half 12a snaps onto second half 12b to form cartridge 12. In this respect, first half 12a includes bosses 13 configured for insertion into corresponding apertures 1511 formed in second half 12b (see FIG. 4).

Pressure balancer cartridge 12 includes hot and cold water inlets 20 and 22, hot and cold water outlets 24 and 26, and a mixed water inlet 28 and outlet 30. Hot and cold water inlets 20 and 22 and mixed water outlet 30 are provided in bottom surface 32 of cartridge 12. Bottom surface 32 of cartridge 12 is substantially planar. Hot and cold water inlets 20 and 22 communicate with hot and cold water supply conduits 16 and 18 respectively. Hot and cold water outlets 24 and 26 and mixed water inlet 28 are provided in top surface 34 and are also isolated from each other by sealing means such as an o-ring (not shown) pressed between top surface 34 and mixing plate assembly 14.

Figure 4:
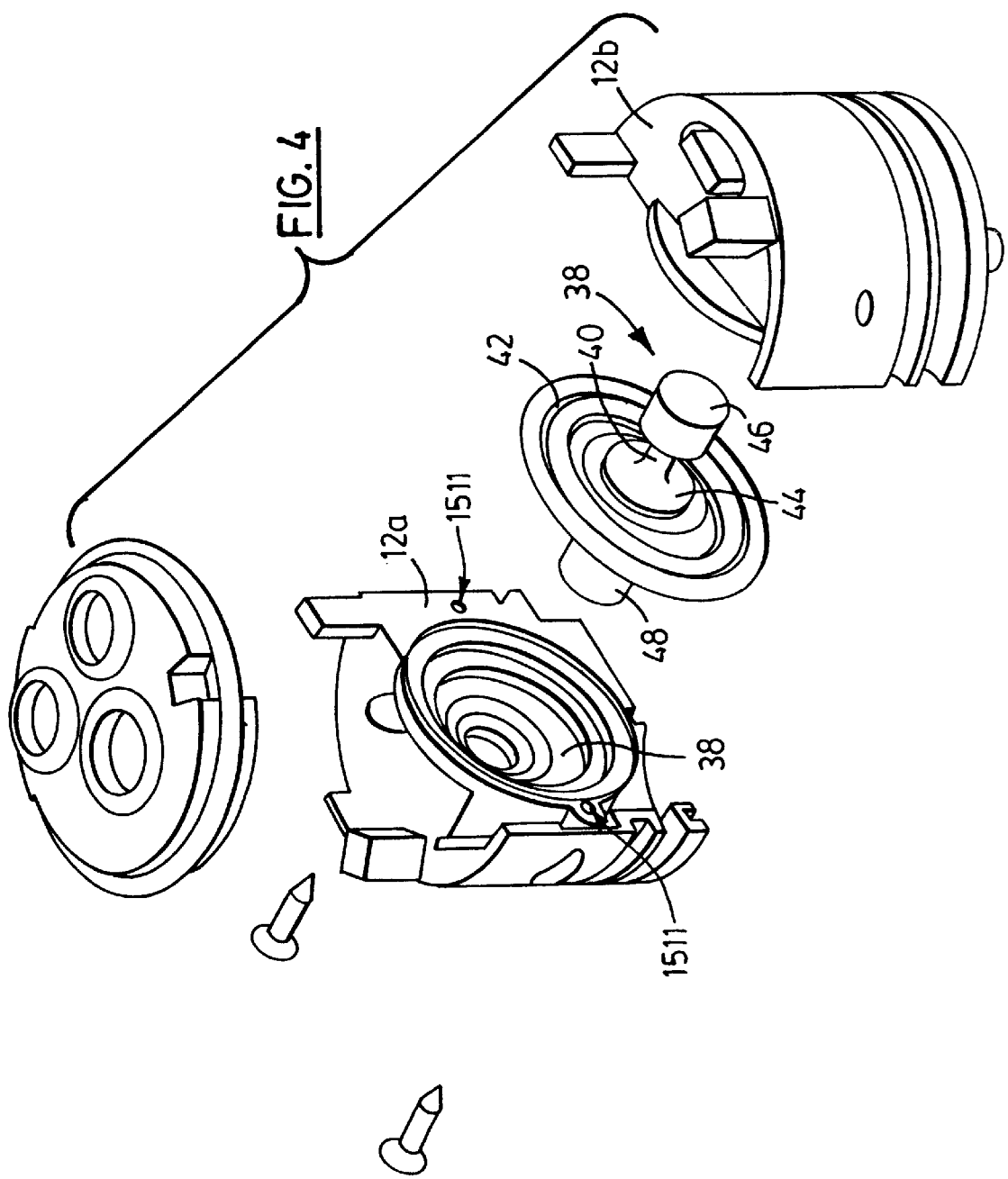
FIG. 4 is an exploded perspective view of a pressure balancer cartridge of an embodiment of a mixer valve assembly of the present invention.
Figure 5:
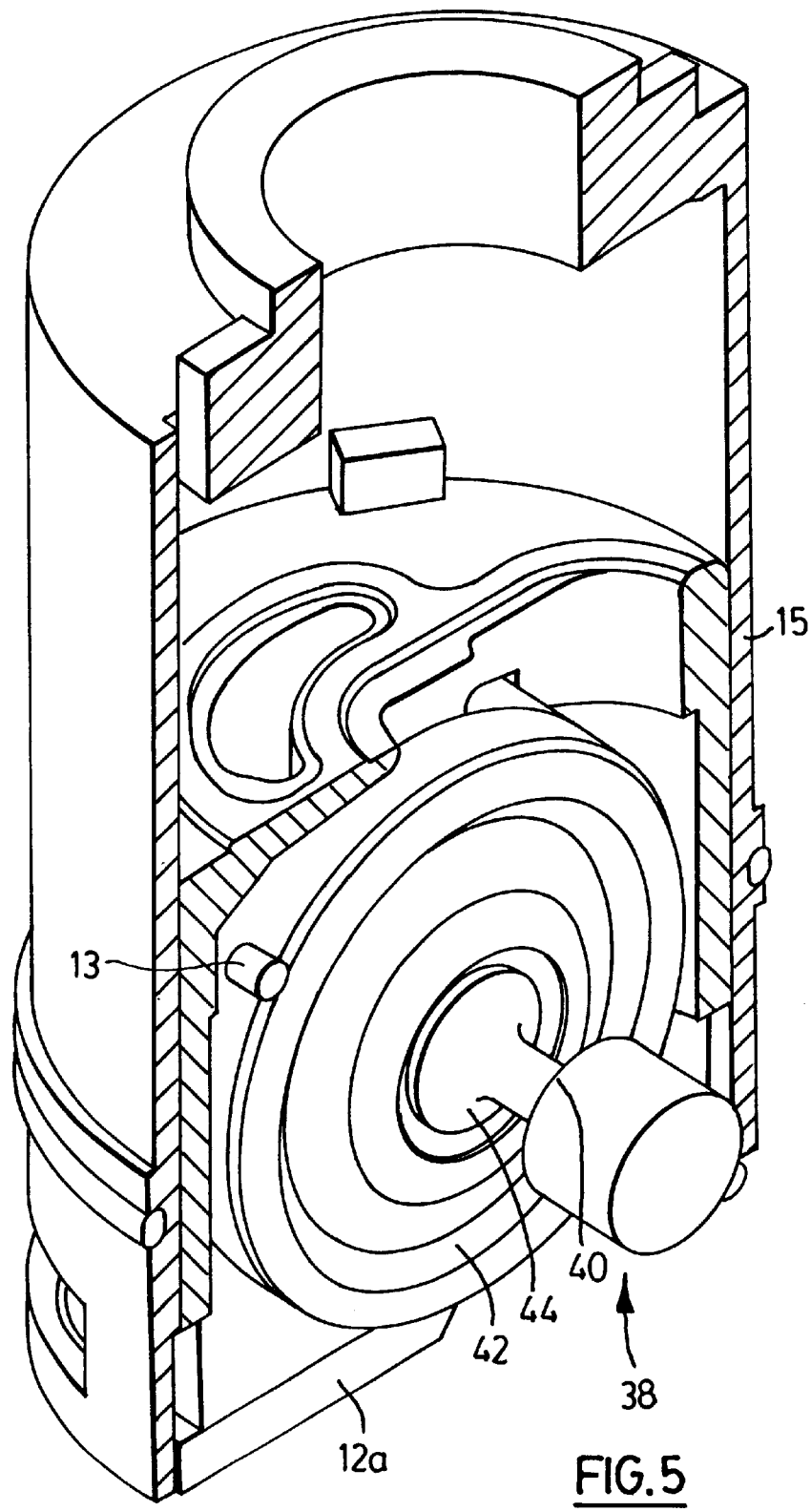
FIG. 5 is a partly cut-away perspective view of a pressure balancer cartridge of an embodiment of a mixer valve assembly of the present invention.

Pressure balancer cartridge 12 is formed with a chamber 36 for receiving piston assembly 38 (see FIGS. 4 and 5). Piston assembly 38 includes a single-piece piston unit 40 and diaphragm 42. Piston unit 40 is formed with a central hub 44 with first and second pistons 46 and 48 extending axially in opposite directions therefrom. Flanges 50 and 52 extend radially from hub 44, forming a groove 54. Diaphragm 42 is positioned within groove 54 and is captured and pinched between first and second halves 12a and 12b, thereby bifurcating chamber 36 into first and second chambers 36a and 36b and creating a seal between hot and cold water passageways 56 and 58. In this respect, piston 46 is associated with the hot water passageway 56 and piston 48 is associated with the cold water passageway 58. Hot water passageway 56 is defined by the flow of hot water from hot water inlet 20 to hot water outlet 24 via orifice 64 and first chamber 36a. Cold water passageway 58 is defined by the flow of cold water from cold water inlet 22 to cold water outlet 26 via orifice 66 and second chamber 36b. A mixed water passageway 59 is also provided within cartridge 12 and extends between mixed water inlet and outlet 28 and 30.

Rearward portions of pistons 46 and 48 are received within damping chambers 60 and 62 respectively. Damping chambers 60 and 62 are provided to prevent rapid movement of the piston assembly 38 as the inlet water pressures vary. In this respect, damping chamber 60 communicates with hot water inlet 20 via orifice 64, first chamber 36a, and bypass 68. Similarly, damping chamber 62 communicates with cold water inlet 22 via orifice 66, second chamber 36b, and bypass 70.

Pistons 46 and 48 are provided with respective valve surfaces 72 and 74 for opening and closing orifices 64 and 66 respectively. Axial movement of pistons 46 and 48, in response to a pressure differential across diaphragm 42, causes the opening and closing of orifices 64 and 66 by movement of valve surfaces 72 and 74 over orifices 64 and 66 respectively.

Under conditions where the hot and cold water pressures from the respective hot and cold water supplies are equal, piston assembly 38 is characterized by a neutral position as shown in FIG. 1 wherein the pressure on the hot water side of the diaphragm 42 is equal to the pressure on the cold water side. With diaphragm 42 being in the neutral position, pistons 46 and 48 are equally spaced from respective orifices 64 and 66 whereby hot and cold water passageways 56 and 58 are equally sized.

If, for example, there is a decrease in the pressure of the cold water supply, the cold water pressure acting on the respective side of the diaphragm 42 will decrease thereby creating a pressure imbalance on opposite sides of the diaphragm 42. Since the cold water pressure has decreased, the greater hot water pressure will exert a force on the respective side of diaphragm 42 whereby the diaphragm 42 moves to the right of the position shown in FIG. 1. As diaphragm 42 moves to the right, or toward the cold water side thereof, piston 46 is moved to the right whereby valve surface 72 introduces further restriction to the flow of hot water through orifice 64 by causing increased closure of orifice 64. Simultaneously, piston 48 moves to the right of the position illustrated in FIG. 1 to reduce restriction to flow through orifice 66 by causing increased opening of orifice 66. As a result of this responsive action by piston assembly 38, the relative volume of hot and cold water flowing into mixing plate assembly 14 is maintained essentially the same as it was before the decrease in cold water pressure.

A decrease in the pressure of hot water will cause a comparable yet opposite reaction by piston assembly 38, whereby pistons 46 and 48 move to the left of the position illustrated in FIG. 1. This provides a comparable response whereby the mixed water is maintained at essentially the same temperature as it was before the decrease in the hot water pressure and without requiring corrective action by manipulation of the mixer plate assembly 14.

Figure 6:
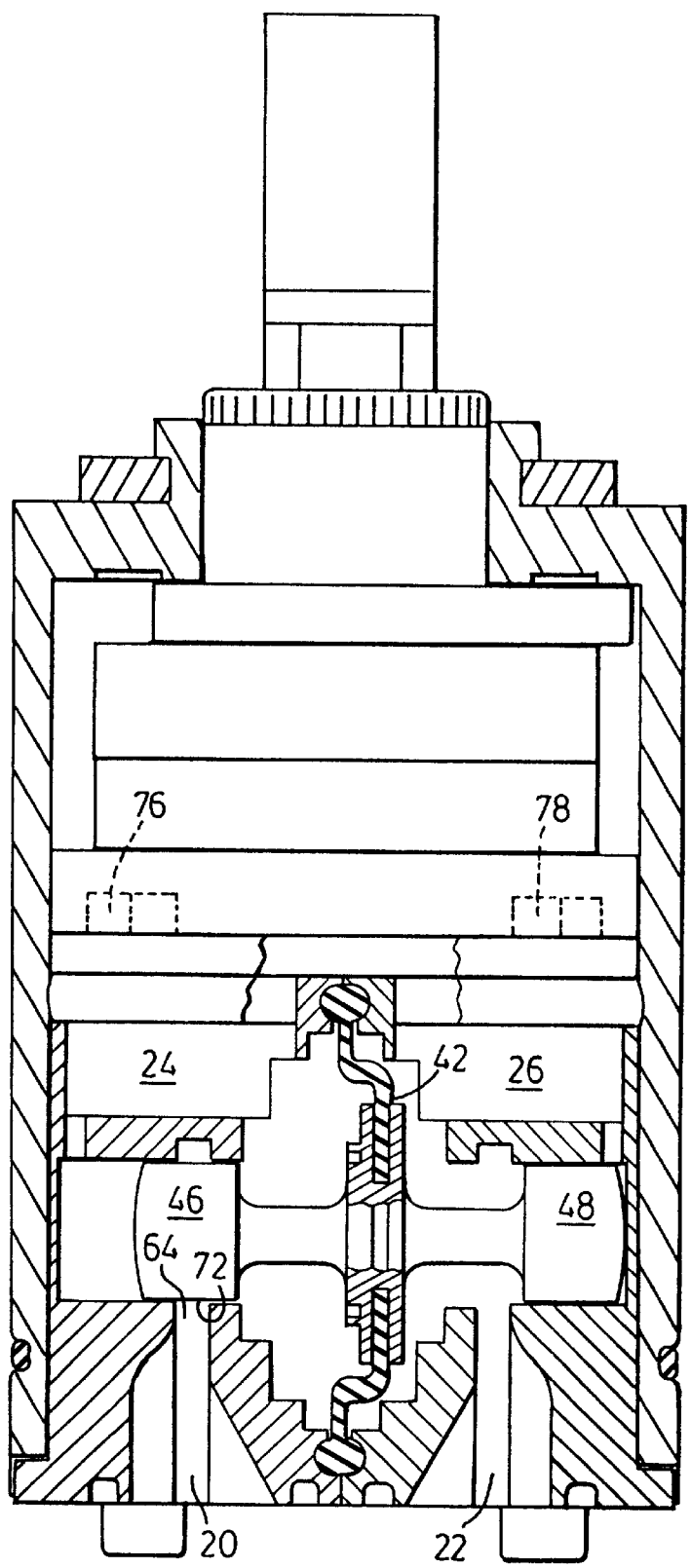
FIG. 6 is a sectional elevation view of an embodiment of a mixer valve assembly of the present invention, illustrating the position of the diaphragm and piston when there is no cold water supply to the mixer valve assembly.

If the cold water pressure fails completely, there is essentially no cold water being supplied to mixer plate assembly 14. If hot water continues to be supplied to the mixer plate assembly 14, and thereby to the user, the user could be scalded. Fortunately, under these circumstances, diaphragm 42 and piston 46 respond by moving to the right, whereby valve surface 72 completely closes orifice 64, causing shut-off of hot water supply to the mixer plate assembly 14 (see FIG. 6).

Figure 7:
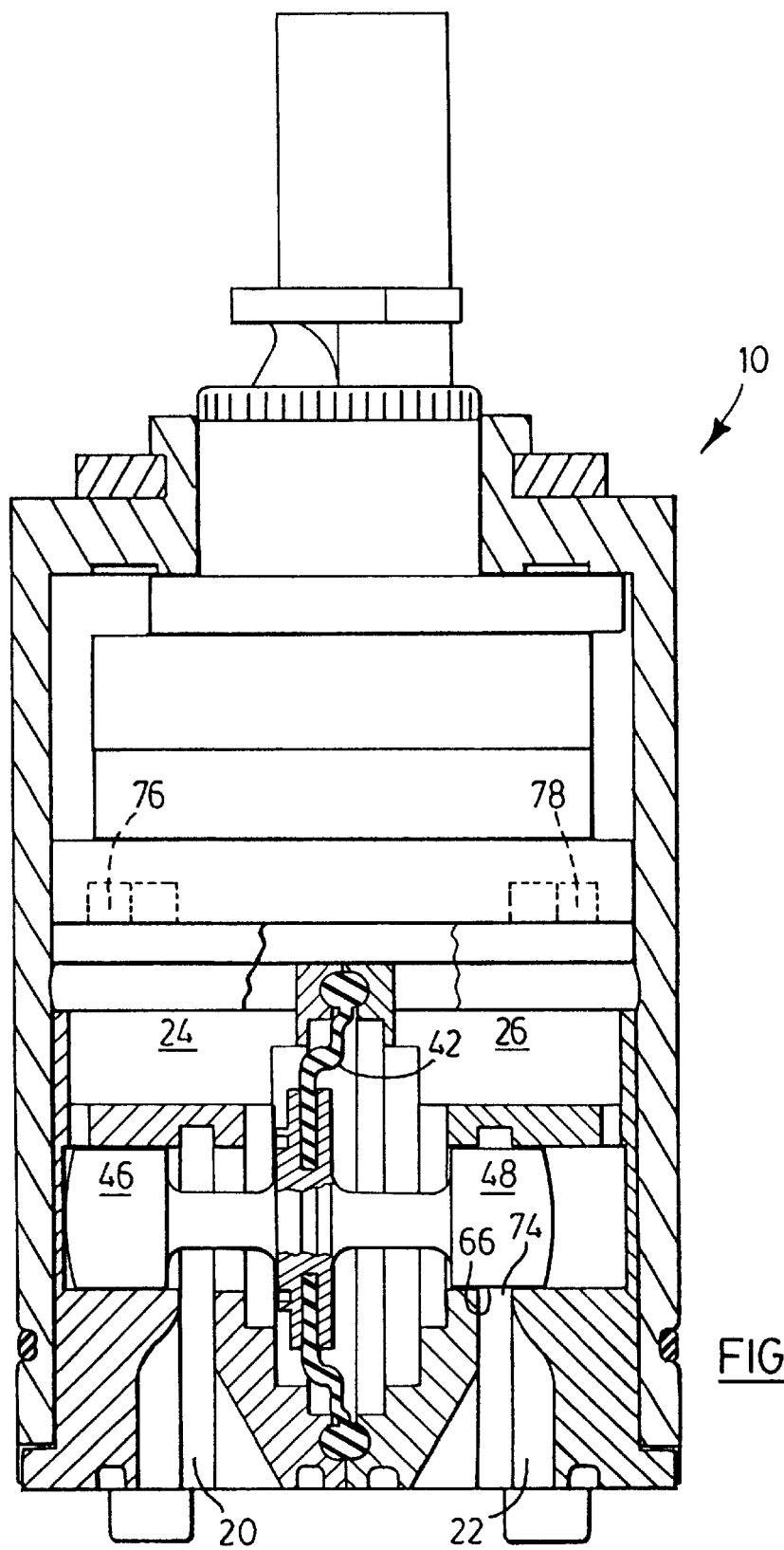
FIG. 7 is a sectional elevation view of an embodiment of a mixer valve assembly of the present invention, illustrating the position of the diaphragm and the piston when there is no hot water supply to the mixer valve assembly.

In similar fashion, when the hot water pressure fails, diaphragm 42 and piston 48 respond by moving to the left, whereby valve surface 74 completely closes orifice 66. This action causes shut-off of cold water supply to the mixer plate assembly 14 (see FIG. 7).

Hot and cold water outlets 24 and 26 of cartridge 12 communicate with hot and cold water inlets 76 and 78 respectively of mixer plate assembly 14. Mixer plate assembly 14 causes mixing of the supplied hot and cold water streams to produce a mixed water stream characterized by a temperature intermediate to that of the hot and cold water streams. Mixer plate assembly 14 further includes a mixed water outlet 80 for delivering the mixed water stream to the mixed water inlet 28 in cartridge 12. Mixer plate assembly 14 comprises a movable plate 82 which is controlled through a lever 83 extending from top surface 84 of movable plate 82. Hot and cold water inlets 76 and 78 and mixed water outlet 80 of mixer plate assembly 14 are formed in a bottom surface 86 of movable plate 82. In this respect, movable plate 82 rests upon and is movable over the top surface 34 of cartridge 12. The movable plate 82 includes a mixing chamber 88 in communication with mixed water outlet 80, and is movable into communication with hot and cold water inlets 76 and 78.

Figure 8:
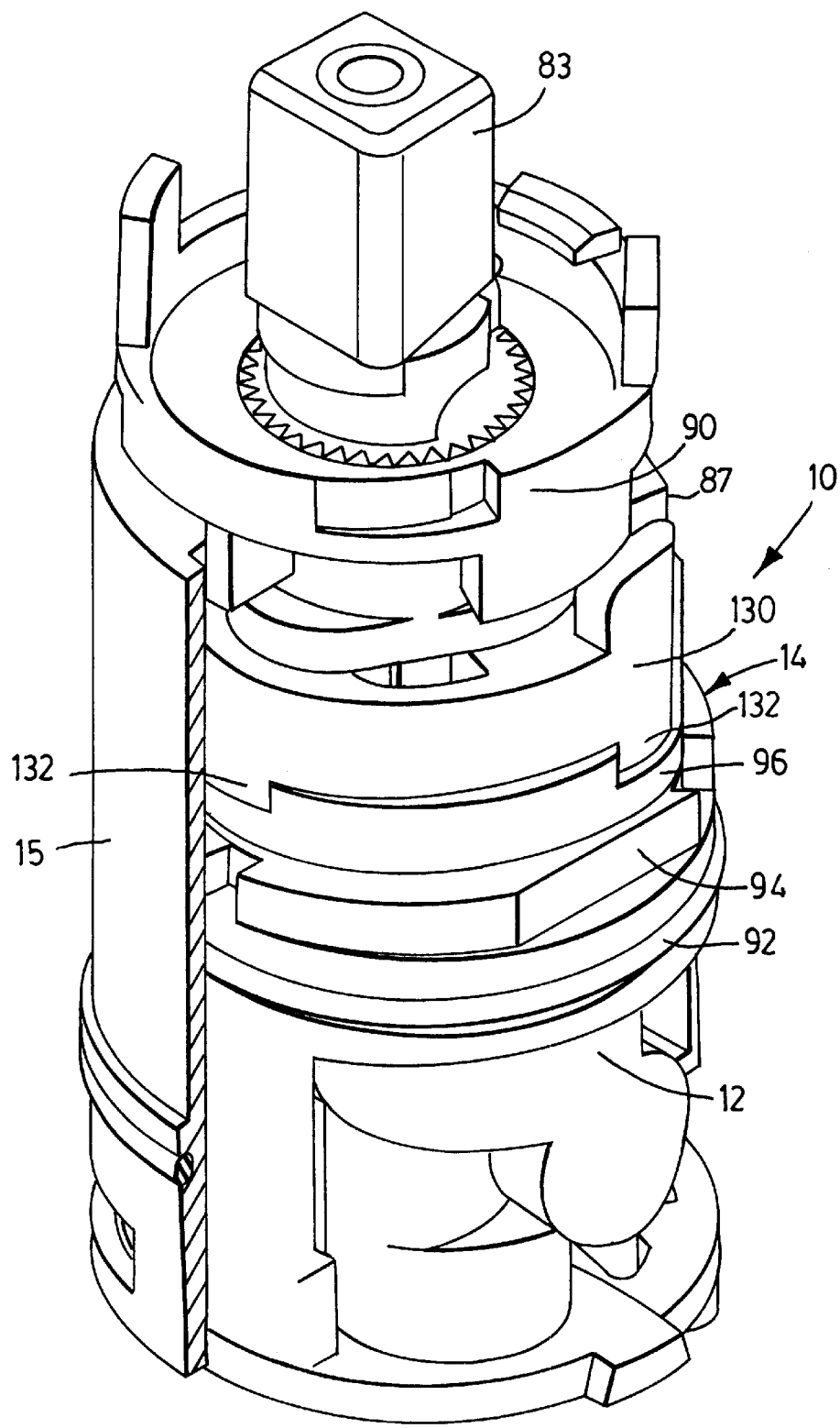
FIG. 8 is a perspective view, partly cut-away, of an embodiment of a mixer valve assembly of the present invention.
Figure 9:
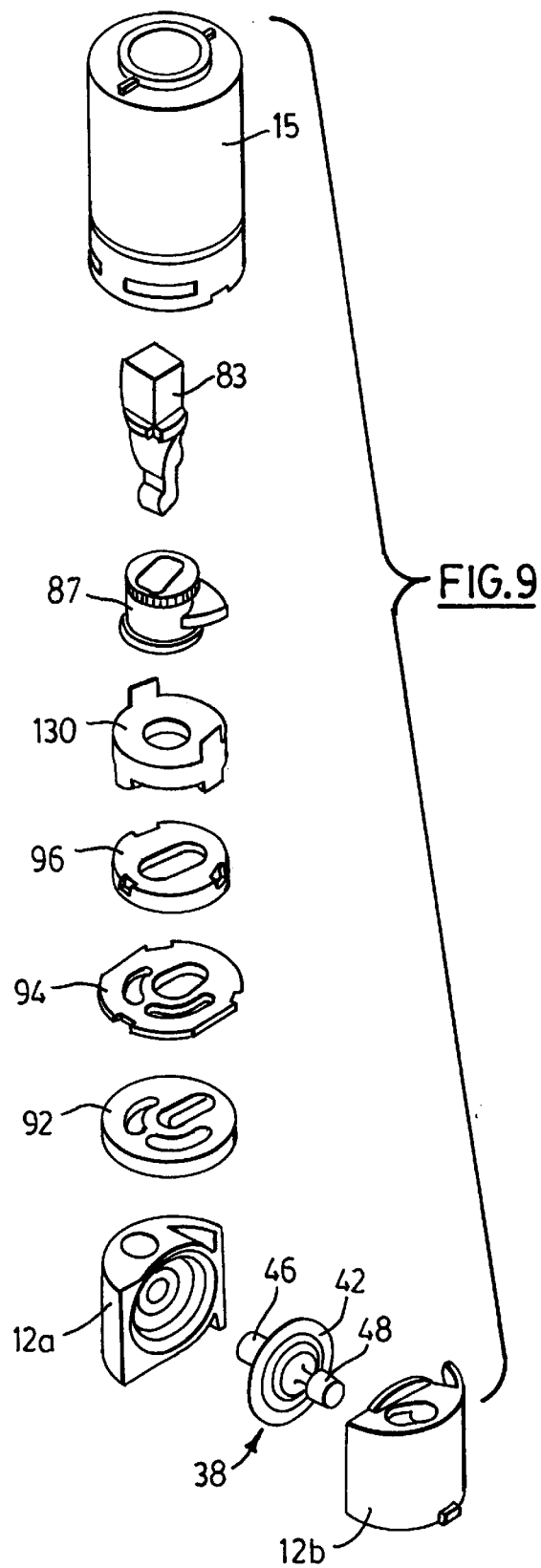
FIG. 9 is an exploded view of an embodiment of a mixer valve assembly of the present invention.
Figure 10:
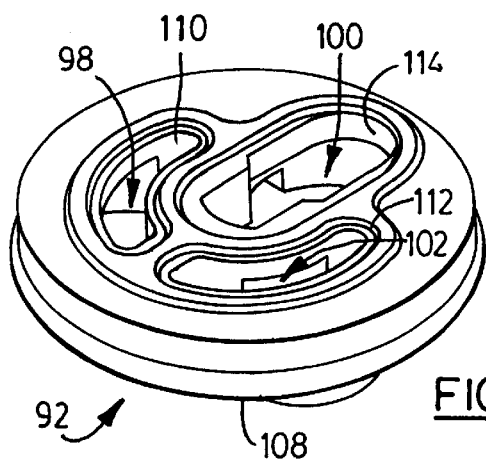
FIG. 10 is a perspective view of a base plate of the mixer valve of an embodiment of a mixer valve assembly of the present invention.
Figure 11:
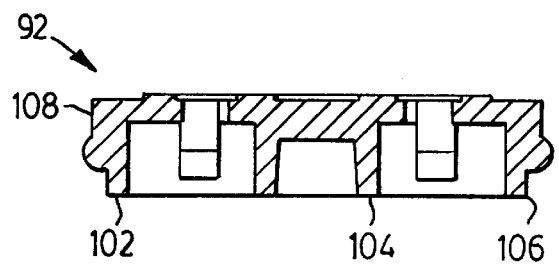
FIG. 11 is a sectional elevation view of the base plate illustrated in FIG. 10.
Figure 16:
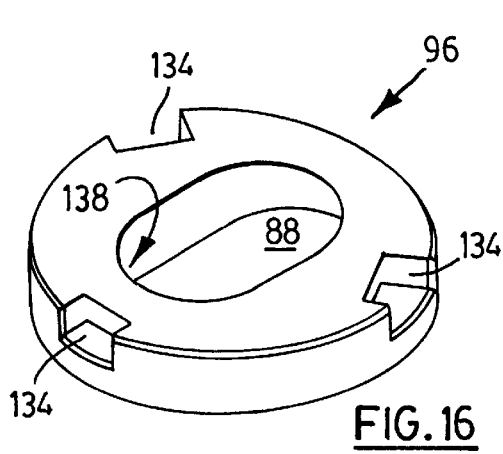
FIG. 16 is a perspective view of the moveable plate of the mixer valve of an embodiment of a mixer valve assembly of the present invention.
Figure 17:
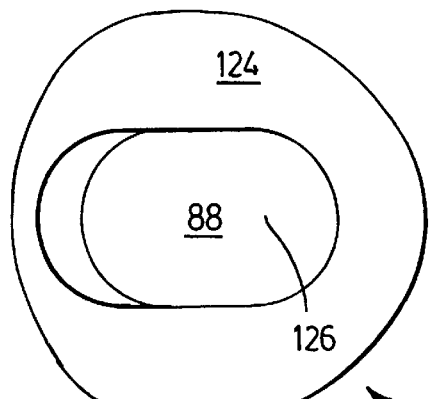
FIG. 17 is a bottom-plan view of the moveable plate illustrated in FIG. 16.
Figure 18:
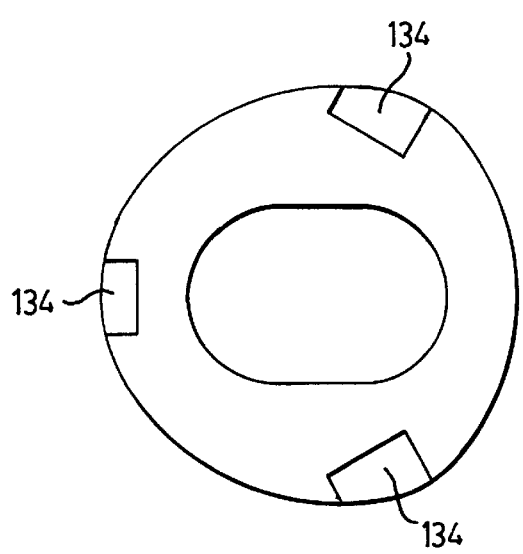
FIG. 18 is a top-plan view of the moveable plate illustrated in FIG. 16.
Figure 14:
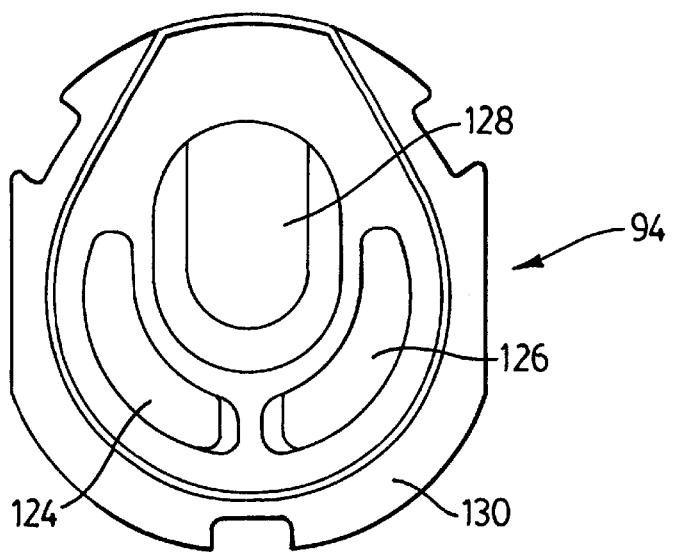
FIG. 14 is a top-plan view of the second flow-through plate illustrated in FIG. 13.
Figure 15:
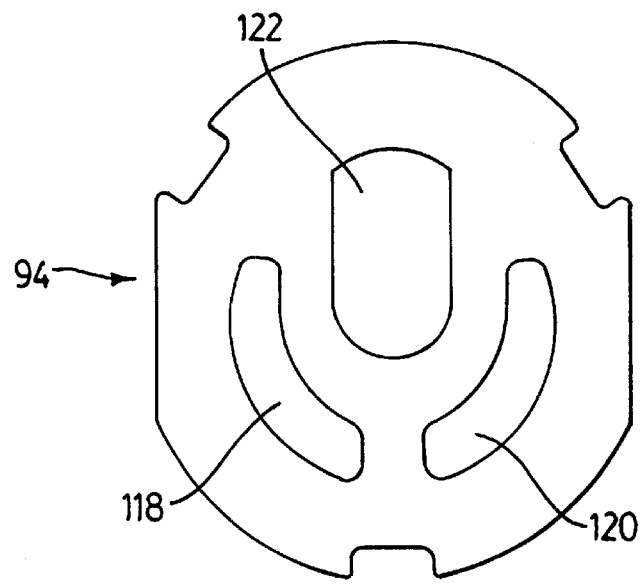
FIG. 15 is a bottom-plan view of the second flow-through plate illustrated in FIG. 13.
Figure 13:
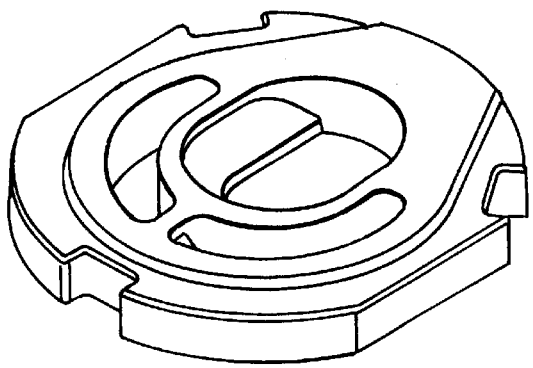
FIG. 13 is a perspective view of the second flow-through plate of the mixer valve of an embodiment of a mixer valve assembly of the present invention.
Figure 19:
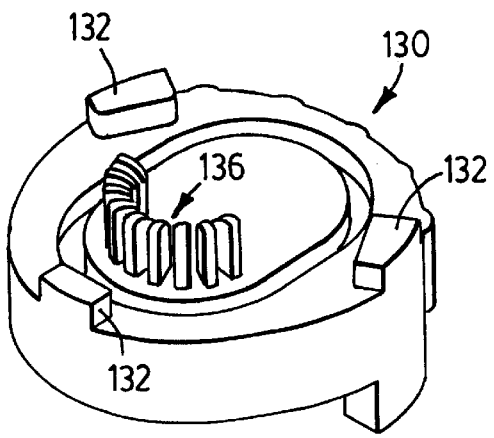
FIG. 19 is a bottom perspective view of the actuator plate of the mixer valve of an embodiment of a mixer valve assembly of the present invention.
Figure 20:
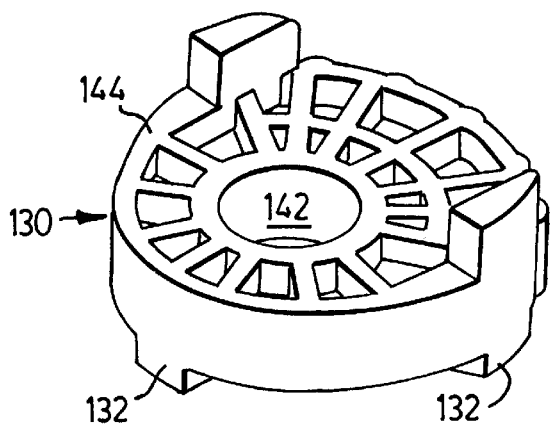
FIG. 20 is a top perspective view of the moveable plate illustrated in FIG. 19.
Figure 21:
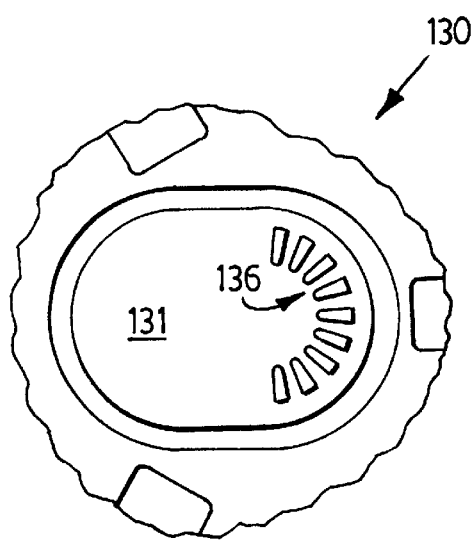
FIG. 21 is a bottom plan view of the actuator plate illustrated in FIG. 19.
Figure 22:
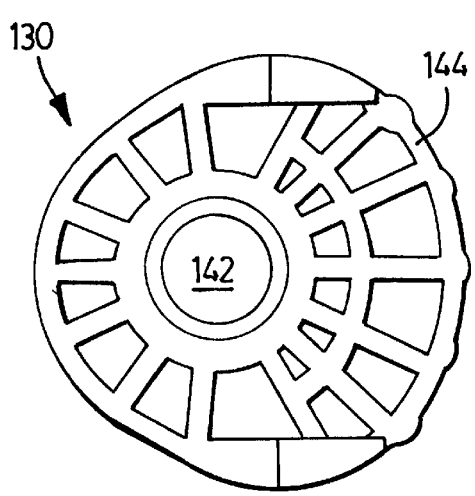
FIG. 22 is a top perspective view of the actuator plate illustrated in FIG. 19.

In one embodiment, and as illustrated in FIGS. 1 and 8, mixer plate assembly 14 comprises a cycling-type valve 90. The cycling-type valve 90 enables independent control of each of the volume of mixed water delivered from the mixing chamber 88 and the temperature of such mixed water. FIG. 9 depicts mixer plate assembly 14 comprising a cycling-type valve 90 in exploded view. In this respect, mixer plate assembly 14 comprises a plurality of plate-like structures comprising throughbores which, when brought into registration with one another, facilitate the passage of hot, cold, and mixed water streams, and more particularly includes a base plate 92 (see also FIGS. 10 and 11), a second flow-through plate 94 (see also FIGS. 13, 14 and 15), and a movable plate 96 (see also FIGS. 16, 17 and 18).

Base plate 92 includes throughbores 98 and 102 to function as hot and cold water supply to mixing chamber 88 and further includes throughbore 100 to deliver a mixed water stream to cartridge 12.

Second plate 94 rests upon and is supported by base plate 92 and includes fluid passageways 118, 120, and 122 which communicate with holes 110, 112, and 114 of base plate 92. Second plate 94 includes tear shaped holes 124 and 126 and an elliptical hole 128 formed in top surface 130. Holes 124, 126, and 128 communicate with passageways 118, 120, and 122 respectively. Movable plate 96 rests upon and is supported by second plate 94. Movable plate 96 includes a valve surface 124 and a recessed cavity 126 being bounded from above by a bottom surface 131 of actuator plate 130 (to be further described below). Movable plate 96 slides over second plate 94 such that valve surface 124 restricts the openings provided by holes 124 and 126, thereby effecting the relative flows of hot and cold water through holes 124 and 126. Water flowing through holes 124 and 126 enter recessed cavity 126, become mixed therein, and then subsequently flows out through hole 128. As such, the space between second plate 94 and movable plate 96, including cavity 126, help define mixing chamber 88.

Actuator plate 130 (see also FIGS. 19, 20, 21, and 22) is fitted in movable plate 96 to cause sliding movement of movable plate 96 over second plate 94, thereby changing the percentage opening of holes 124 and 126. In this respect, actuator plate 130 includes lugs 132 which are received within corresponding recesses 134 formed within movable plate 96. Actuator plate 130 further includes downwardly depending teeth 136 bearing upon sidewall 138 in recessed cavity 126. Actuator plate 130 is driven by lever 83 fitted within and extending through housing 87 (see FIGS. 23, 24, and 25). Lever 83 includes a bottom portion 140 received within an aperture 142 formed on top surface 144 of actuator plate 130.

Figure 26:
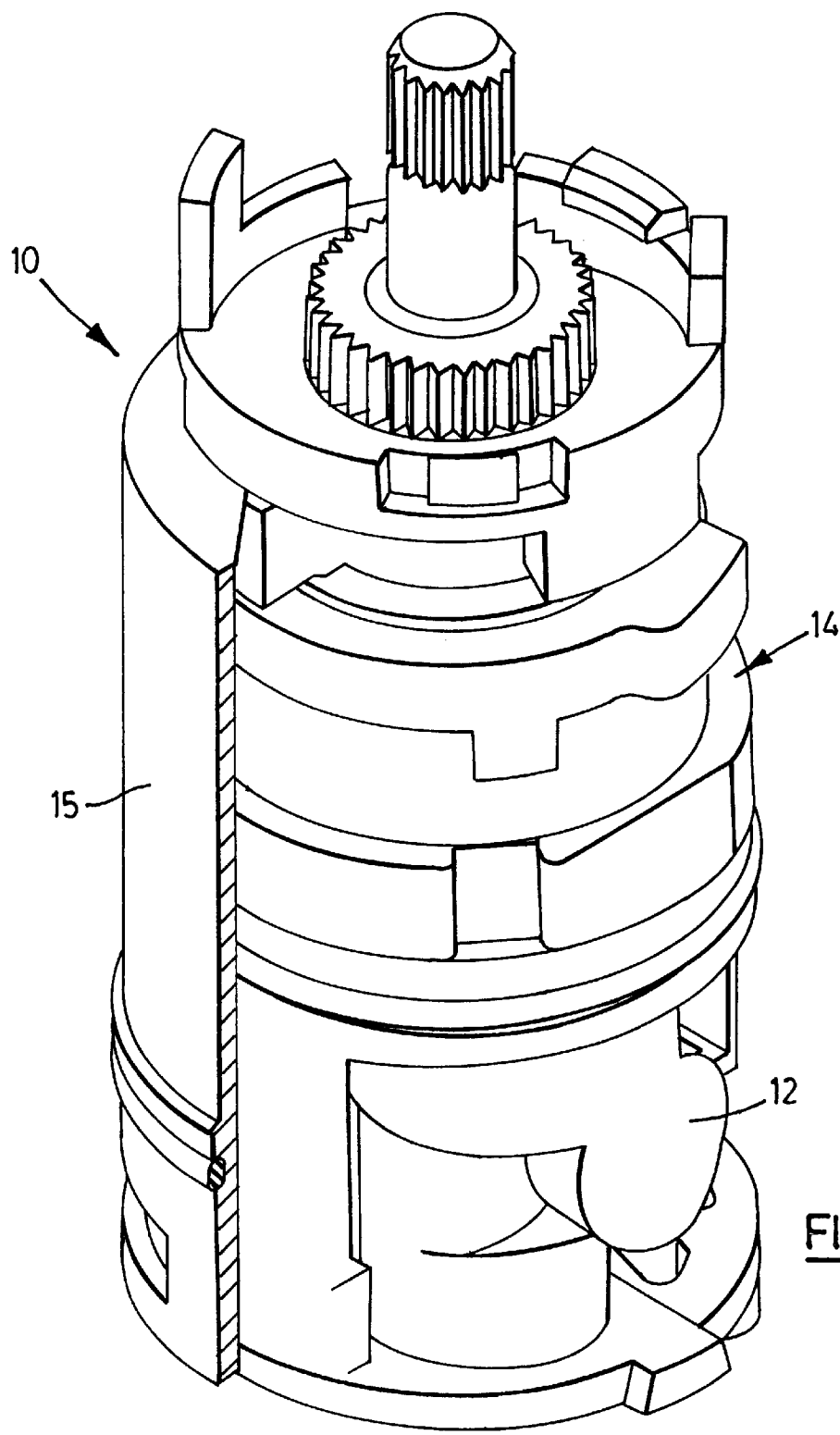
FIG. 26 is a perspective view, partly cut-away, of another embodiment of another embodiment of a mixer valve assembly of the present invention.

One embodiment of mixer plate assembly 14 has been described. However, other mixer plate-type assemblies can also be used in conjunction with cartridge 12. For instance, mixer plate assembly 14 can also comprise a volume-type control valve (see FIG. 26). Such valves cannot effect independent control of each of the volume of mixed water delivered from the mixing chamber 88 and the temperature of such mixed water. Rather, the action of such valves effect simultaneous control of both volume and temperature.

Figure 27:
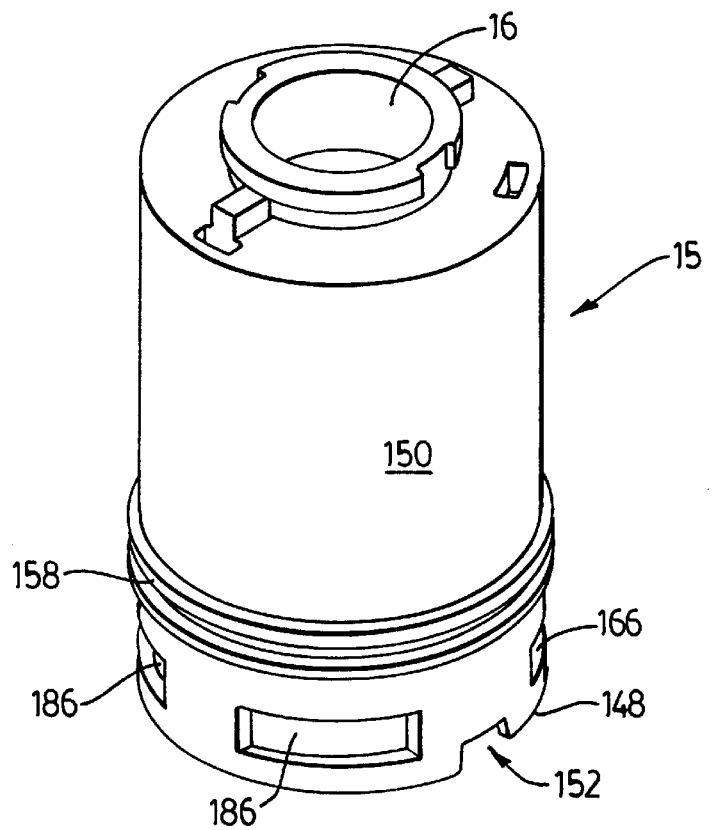
FIG. 27 is a perspective view of the housing of an embodiment of a mixer valve assembly of the present invention.
Figure 28:
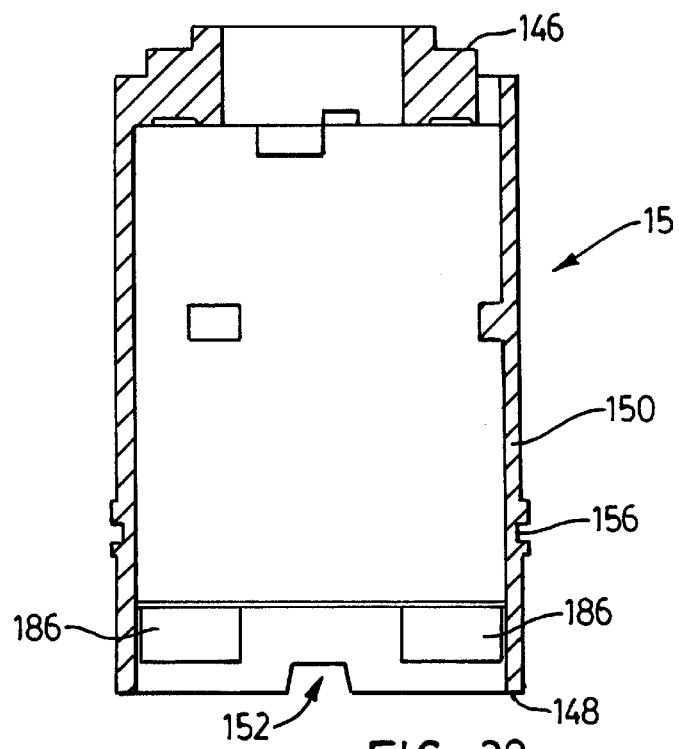
FIG. 28 is a sectional elevation view of the housing illustrated in FIG. 27.

Cartridge 12 and mixer plate assembly 14 are contained within housing 15, an embodiment of which is illustrated in FIGS. 27 and 28. Housing 15 is generally cylindrical in shape and is open at top and bottom ends 146 and 148 with sidewall 150 extending therebetween. The opening formed in top end 146 is generally smaller than the opening in bottom end 148. Bottom surface 32 of cartridge 12 extends from the opening in bottom end 148. Lever 84 extends from the opening in top end 146. Notches 152 are formed in sidewall 150 and extend upwardly from bottom end 146. Notches 152 are configured to be pressed over and into engagement with lugs 154 extending radially from the bottom surface 32 of cartridge 12. By fitting notches 152 over lugs 154, cartridge 12 and mixer plate assembly 14 are contained within housing 15. When disposed in this manner, perimeter o-ring 93 on base plate 92 is pressed against inner surface 151 of sidewall 150 to effect sealing of space 153 between cartridge 12 and housing 15 from space 155 above o-ring 93 (see FIG. 12). Groove 156 is formed within sidewall 150 intermediate the top and bottom ends 146 and 148 and receives a sealing member such as an o-ring 158 to effect sealing with a sleeve assembly as will be further described below.

Figure 12:
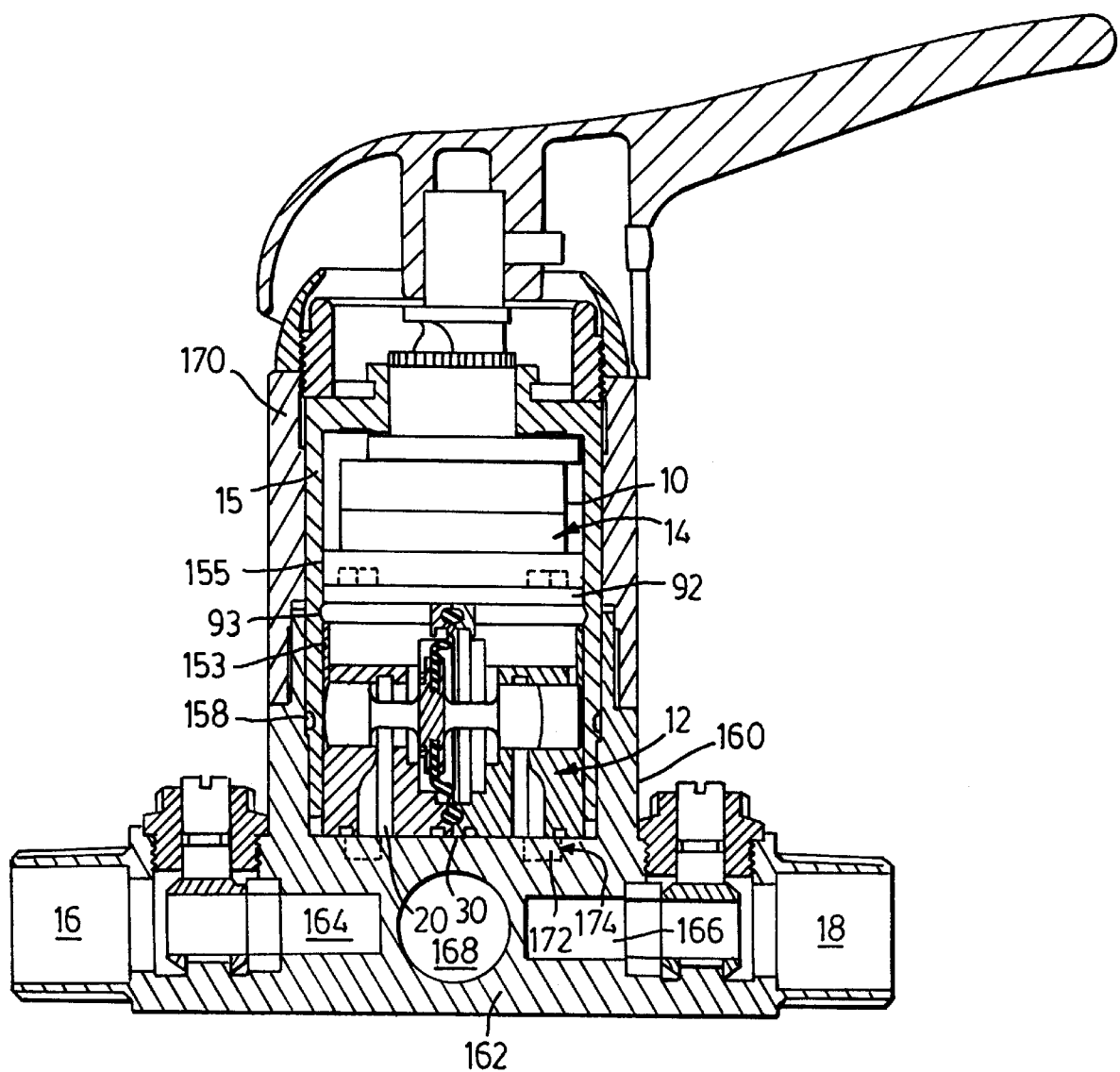
FIG. 12 is a sectional elevation view of an embodiment of a water faucet of the present invention.

Hot and cold water supply conduits 16 and 18 are typically connected to a faucet body 160 which includes a base 162, within which are formed hot and cold water outlets 164 and 166, and a sleeve 170 (see FIG. 12). Mixer valve 10 is received within sleeve 170 and rests upon and is supported by base 162. Hot and cold water outlets communicate with hot and cold water supply conduits 16 and 18 to deliver hot and cold water streams to mixer valve 10. Mixed water inlet 168 is also formed within base 162 to receive a mixed water stream from mixer valve 10. In this respect, hot and cold water inlets 20 and 22 and mixed water outlet 30 of cartridge 12 are connected to hot and cold water outlets 164 and 166 and mixed water inlet 168 respectively. To this end, bottom surface 32 of cartridge 12 is pressed against base 162 such that hot and cold water inlets 20 and 22 are aligned with hot and cold water outlets 164 and 166 and such that mixed water outlet 30 is aligned with mixed water inlet 168. To facilitate alignment, bottom surface 32 includes downwardly extending feet 172 which are received within corresponding apertures 174 in base 162. Hot and cold water passageways, defined by hot water outlet and inlet 164 and 20 and cold water outlet and inlet 166 and 22 respectively, and mixed water passageway, defined by mixed water outlet and inlet 30 and 168, are isolated from each other by a sealing member such as an o-ring (not shown) pressed between bottom surface 32 and base 162.

While mixer valve 10 is inserted within sleeve 170, o-ring 158 provided within sidewall 150 is pressed against sidewall 172 of sleeve 170, thereby externally sealing a bottom section 17 of housing 15 below the o-ring 158 from a top section 19 of housing 15. O-ring 158 is vertically disposed above the connection of housing 15 to cartridge 12 at lugs 154.

Bypass 180 extends from mixed water passageway 59 into an outlet 182 formed in sidewall 150 of cartridge 12. Housing 15 is provided with slots 186 to permit communication between mixed water passageway 59 and a space 186 defined by sleeve 170, o-ring 158, and cartridge 12. In this respect, mixed water is collected in space 168 and is permitted to drain via outlet 30 in bottom surface 32.

Although the disclosure describes and illustrates certain embodiments, it is to be understood that the invention is not limited to these particular embodiments. Many variations and modifications will now occur to those skilled in the art. For definition of the invention, references to be made to the appended claims.

What is claimed is:

1. A mixer valve assembly comprising a pressure balancer cartridge including radially extending lugs, a mixer valve in fluid communication with, and supported by the pressure balancer cartridge, and a housing fitted over the pressure balancer cartridge and the mixer valve, the housing including notches for coupling to the lugs.

2. The mixer valve as claimed in claim 1, wherein the pressure balancer cartridge includes a first hot water passage, a first cold water passage, and a first mixed water passage, and wherein the mixer valve includes a second hot water passage, a second cold water passage, and a second mixed water passage, and wherein the first hot water passage is coupled to the second hot water passage, the first cold water passage is coupled to the second cold water passage, and the first mixed water passage is coupled to the second mixed water passage.

3. The mixer valve assembly as claimed in claim 1, wherein the housing includes an exterior surface, and wherein a sealing member is disposed about the exterior surface.

4. The mixer valve assembly as claimed in claim 2, wherein the housing includes an exterior surface, and wherein a sealing member is disposed about the exterior surface.

5. The mixer valve assembly as claimed in claim 1, wherein the housing includes a first end and a second end, and wherein the first end includes a first aperture and the second end includes a second aperture, and wherein the mixer valve includes a control lever extending through the first aperture, and wherein the cartridge extends through the second aperture.

6. The mixer valve assembly as claimed in claim 5, wherein the pressure balancer cartridge includes a first end and a second end, and wherein a plurality of feet project from the first end, and wherein the mixer valve is supported on the second end.

7. The mixer valve assembly as claimed in claim 2, wherein the housing includes a first end and a second end, and wherein the first end includes a first aperture and the second end includes a second aperture, and wherein the mixer valve includes a control lever extending through the first aperture, and wherein the cartridge extends through the second aperture.

8. The mixer valve assembly as claimed in claim 7, wherein the pressure balancer cartridge includes a first end and a second end, and wherein a plurality of feet project from the first end, and wherein the mixer valve is supported on the second end.

9. The mixer valve assembly as claimed in claim 8, wherein the first end of the cartridge includes a hot water inlet, a cold water inlet, and a mixed water outlet communicating, respectively, with the first hot water passage, the first cold water passage, and the first mixed water passage.

10. The mixer valve assembly as claimed in claim 2, wherein the mixer valve includes a mixing chamber coupled to each of the second hot water passage and the second cold water passage.

11. The mixer valve assembly as claimed in claim 9, wherein the mixer valve includes a mixing chamber coupled to each of the second hot water passage and the second cold water passage.

12. The mixer valve assembly as claimed in claim 6, wherein the first end is characterized by a substantially planar surface, and wherein the lugs are substantially co-planar with the first end surface.

13. A water faucet comprising:
   a faucet body including:
      a sleeve;
      a base provided at one end of the sleeve;
      and fluid passages formed in the base; and
   a mixer valve assembly disposed within the faucet body, including:
      a pressure balancer cartridge including radially extending lugs;
      a mixer valve in fluid communication with, and supported by the pressure balancer cartridge, and
      a housing fitted over the pressure balancer cartridge and the mixer valve, the housing including notches for coupling to the lugs.

14. The water faucet as claimed in claim 13, wherein the pressure balancer cartridge includes a first hot water passage, a first cold water passage, and a first mixed water passage, and wherein the mixer valve includes a second hot water passage, a second cold water passage, and a second mixed water passage, and wherein the first hot water passage is coupled to the second hot water passage, the first cold water passage is coupled to the second cold water passage, and the first mixed water passage is coupled to the second mixed water passage.

15. The water faucet as claimed in claim 13, wherein the housing includes an exterior surface, and wherein a sealing member is disposed about the exterior surface in sealing engagement with the faucet body.

16. The water faucet assembly as claimed in claim 14, wherein the housing includes an exterior surface, and wherein a sealing member is disposed about the exterior surface in sealing engagement with the faucet body.

17. The water faucet assembly as claimed in claim 13, wherein the housing includes a first end and a second end, and wherein the first end includes a first aperture and the second end includes a second aperture, and wherein the mixer valve includes a control lever extending through the first aperture, and wherein the cartridge extends through the second aperture.

18. The water faucet assembly as claimed in claim 17, wherein the pressure balancer cartridge includes a first end and a second end, and wherein a plurality of feet project from the first end, and wherein the mixer valve is supported on the second end.

19. The water faucet assembly as claimed in claim 14, wherein the housing includes a first end and a second end, and wherein the first end includes a first aperture and the second end includes a second aperture, and wherein the mixer valve includes a control lever extending through the first aperture, and wherein the cartridge extends through the second aperture.

20. The water faucet assembly as claimed in claim 19, wherein the pressure balancer cartridge includes a first end and a second end, and wherein a plurality of feet project from the first end, and are received within the base of the faucet body, and wherein the mixer valve is supported on the second end.

21. The water faucet assembly as claimed in claim 20, wherein the first end of the cartridge includes a hot water inlet, a cold water inlet, and a mixed water outlet communicating, respectively, with the first hot water passage, the first cold water passage, and the first mixed water passage.

22. The water faucet assembly as claimed in claim 14, wherein the mixer valve includes a mixing chamber coupled to each of the second hot water passage and the second cold water passage.

23. The water faucet assembly as claimed in claim 21, wherein the mixer valve includes a mixing chamber coupled to each of the second hot water passage and the second cold water passage.

24. The water faucet assembly as claimed in claim 18, wherein the first end is characterized by a substantially planar surface, and wherein the lugs are substantially co-planar with the first end surface.

\* \* \* \* \*